United States Patent
Yuan et al.

(10) Patent No.: US 7,532,359 B2
(45) Date of Patent: May 12, 2009

(54) SYSTEM AND PROCESS FOR AUTOMATIC COLOR AND EXPOSURE CORRECTION IN AN IMAGE

(75) Inventors: Po Yuan, Renton, WA (US); Zhengyou Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 10/796,879

(22) Filed: Mar. 9, 2004

(65) Prior Publication Data

US 2005/0200921 A1 Sep. 15, 2005

(51) Int. Cl.
G06F 15/00 (2006.01)

(52) U.S. Cl. ............... 358/1.9; 358/518; 358/519; 358/520; 358/522

(58) Field of Classification Search .......... 358/1.9, 358/518, 519, 520, 522
See application file for complete search history.

(56) References Cited

U.S. PATENT DOCUMENTS

| | | | | |
|---|---|---|---|---|
| 5,812,286 A | * | 9/1998 | Lin | 358/519 |
| 6,323,934 B1 | * | 11/2001 | Enomoto | 355/40 |
| 6,687,414 B1 | * | 2/2004 | Edgar | 382/275 |
| 7,095,434 B1 | * | 8/2006 | Ikeda | 348/219.1 |
| 2003/0174886 A1 | * | 9/2003 | Iguchi et al. | 382/167 |

OTHER PUBLICATIONS

Copending U.S. Patent Application "A System and Process for Automatic Exposure Correction in an Image," U.S. Appl. No. 10/796,880, filed Mar. 9, 2004.

* cited by examiner

Primary Examiner—Twyler L. Haskins
Assistant Examiner—Michael Burleson
(74) Attorney, Agent, or Firm—Lyon & Harr, LLP; Richard T. Lyon (57) ABSTRACT

A system and process for improving the appearance of improperly colored and/or improperly exposed images is presented. This involves the use of two novel techniques—namely an automatic color correction technique and an automatic exposure correction technique. The automatic color correction technique takes information from within an image to determine true color characteristics, and improves the color in improperly colored pixels. The automatic exposure correction technique measures the average intensity of all of the pixels and adjusts the entire image pixel by pixel to compensate for over or under exposure. These techniques are stand alone in that each can be applied to an image exclusive of the other, or they can both be applied in any order desired.

24 Claims, 4 Drawing Sheets

SYSTEM AND PROCESS FOR AUTOMATIC COLOR AND EXPOSURE CORRECTION IN AN IMAGE

BACKGROUND

1. Technical Field

The invention is related to improving the appearance of digitized or digital images, and more particularly to a system and process for improving the appearance of improperly exposed and/or improperly colored images.

2. Background Art

Color images captured with a digital camera or obtained by scanning (i.e., digitizing) photographs can exhibit a less than appealing appearance owing to under or over exposed pixels and improperly colored pixels. In the case of exposure, capturing an image or taking a photograph using the proper exposure is often a difficult task. Several factors can contribute to poorly exposed images and photographs. For example, modern cameras often have automatic systems for estimating the proper exposure. However, these systems are sometimes fooled owing to the lighting conditions or atypical characteristics of the scene being captured. In addition, these modern cameras, as well as their predecessors, often allow the photographer to manually adjust the exposure setting, thereby introducing the possibility of human error.

Improperly colored pixels typically occur because the colors of images recorded by a camera depend on the spectral characteristics of the camera optics, the lighting conditions of the scene and the characteristics of the color filters employed in the camera. As a result, the primary color data captured may not be a faithful rendition of the actual colors found in the scene.

To resolve the problems of improperly exposed and colored images, post-capture corrective measures are often employed. There are two categories of systems. In the first category, the systems that implement these corrective measures can be manual in that, for example, a user views the image on a computer screen and employs a user interface to interactively adjust the color and/or exposure. In the second category, the systems provide for automatic correction of color and/or exposure in an image. In these systems, a user typically just accesses the image, which can be viewed on a computer screen, and activates an automatic correction program. This activation can be implicit, in the sense that the automatic correction program is called whenever the image is accessed; it can also be explicit, in which case the user clicks on a button to call the correction program when necessary. The present invention falls into this latter automatic correction category.

SUMMARY

The present invention is directed toward a system and process for improving the appearance of improperly exposed and/or improperly colored images. This involves the use of two novel techniques—namely an automatic color correction technique and an automatic exposure correction technique. The automatic color correction technique takes information from within an image to determine true color characteristics, and improves the color in improperly colored pixels. The automatic exposure correction technique measures the average intensity of all of the pixels and adjusts the entire image pixel by pixel to compensate for over or under exposure.

In regard to the automatic color correction technique, this generally involves a system and process for correcting the color of improperly colored pixels of an image having multi-level primary color channels (e.g., red (R), green (G), and blue (B)) by first computing a histogram of the color levels of the image pixels for each of the color channels. The lowermost and uppermost color levels for each of the color channels, which are consistent with the overall distribution of color levels for the corresponding channel, are then computed using the color channel histograms. In addition, the per channel average color level for a group of the brightest pixels is computed. The lowermost and uppermost color levels for each of the color channels and the per channel average color levels of the brightest pixels are used to compare the color levels of pairs of the color channels to determine if the color levels in each of the pairs is balanced. In tested embodiments of the present automatic color correction system and process employing RGB color channels, the green color channel is used as the reference for balancing such that the green and blue color channels are compared and the green and red color channels are compared. This was done because in the Bayer CCD chips typically used in digital cameras there are twice as many G pixels than R and B pixels, and so the G values are considered to be more reliable. However, this assumption need not be made and another of the color channels can be used as the reference channel. A pair of color channels is considered balanced if the dynamic range of their color levels match within a prescribed tolerance. If the color channels are balanced, then no correction is required. However, if a compared channel pair is found to be out of balance, then the dynamic range of the color channel with the narrower range is linearly expanded to match the channel with the wider dynamic range to a desired degree.

In regard to ascertaining if the dynamic color level ranges of a compared channel pair match within a prescribed tolerance, this involves first determining if the difference between the average color levels of the group of the brightest pixels for the channel pair under consideration is less than their average multiplied by a prescribed tolerance value. It is also determined whether the difference between the lowermost color levels of color channel pair is less than their average multiplied by the prescribed tolerance value. If either of the computed differences is determined not to be less, the dynamic color level ranges of the channel pair being compared is deemed not to match.

The aforementioned desired degree of matching between the dynamic range of the color channel with the narrower range and the range of the channel with the wider range refers to a potential tailoring of how aggressively the color correction is performed. More particularly, this involves varying the degree to which the color channel with the narrower range is made to match the channel with the wider dynamic range between the extremes of expanding the channel with the narrower range to match the full range of the channel with the wider range, to no expansion at all, depending on the value of a safeness parameter. This safeness parameter can be prescribed or user-specified.

If the safeness parameter is employed, linearly expanding the dynamic range of the color channel with the narrower range to match the channel with the wider dynamic range to the desired degree involves first computing new lowermost and uppermost levels for the channel with the wider dynamic color level range that reflect the degree to which it is desired for the narrower range channel to match the wider range channel. The new lowermost and uppermost levels of the channel with the wider dynamic color level range and the lowermost and uppermost levels of the channel with the narrower range are then employed to establish a linear color correction transform that maps each old color level to a new color level. This linear color correction transform is then applied to the narrower range color channel to produce color corrected pixel levels for each pixel of the image. Due to use of the safeness parameter, the color correction program can be called multiple times to achieve more aggressive color correction. The color correction process will always converge. However, in one embodiment, the safeness parameter was chosen such that one execution is enough to result in satisfactory color correction for a majority the tested images.

In regard to the automatic exposure correction technique, this generally involves a system and process for correcting the exposure of improperly exposed pixels of an image by first linearly expanding the dynamic range of the intensity levels of the image pixels so as to match the full dynamic intensity range available for the application to a desired degree. It is then determined whether the linearly expanded intensity levels of the image pixels are evenly distributed. If they are, then no further correction is required. However, if the levels are not found to be evenly distributed, then a gamma correction factor is computed and applied to the linearly expanded intensity level of each pixel to produce corrected intensity values.

More particularly, the aforementioned linear expansion involves first computing a histogram of the intensity levels of the image pixels, and then computing the lowermost and uppermost intensity levels that are consistent with the overall distribution of intensity levels in the image. Next, new lowermost and uppermost intensity levels are computed that span the full dynamic intensity range available to the desired degree. The originally computed lowermost and uppermost intensity levels and the new lowermost and uppermost intensity levels are employed to establish a linear intensity correction transform that maps the original intensity level of each pixel in the image to a linearly expanded intensity level. The linear intensity correction transform is then to each pixel of the image.

The aforementioned desired degree of matching between the dynamic range of the original intensity levels and the full dynamic intensity range available refers to a potential tailoring of how aggressively the exposure correction is performed. More particularly, this involves varying the degree to which intensity levels of the image pixels are made to match the full dynamic intensity range available between the extremes of expanding the dynamic range of the intensity levels to match the full dynamic intensity range, to no expansion at all, depending on the value of a safeness parameter. This safeness parameter can be prescribed or user-specified, and need not be the same parameter used with the previously-described color correction technique. Due to use of the safeness parameter, the exposure correction program can be called multiple times to achieve more aggressive exposure correction. The exposure correction process will always converge. However, in one embodiment, the safeness parameter was chosen such that one execution is enough to produce satisfactory exposure correction for the majority of the tested images.

In regard to determining whether the linearly expanded intensity levels of the image pixels are evenly distributed, this generally involves first computing a histogram from the linearly expanded pixel intensity levels. A 50 percentile (i.e., median) intensity level is then computed from the linearly expanded pixel intensity level histogram as the level where (1) the sum of the number of pixels exhibiting a level within a prescribed range of levels extending from lowest level possible to the unknown median level, less one level, is less than the total number of pixels in the image multiplied by 0.5, and (2) the sum of the number of pixels exhibiting a level within a prescribed range of levels extending from lowest level possible to the unknown median level, is greater than or equal to the total number of pixels in the image multiplied by 0.5. It is next determined if the difference between the median intensity level and one half the maximum intensity level is less than or equal to the maximum intensity value multiplied by an intensity tolerance factor. If it is, then the intensity levels are evenly balanced and no further exposure correction is required. Otherwise, the linearly expanded intensity levels are deemed not to be evenly distributed.

In cases where the linearly expanded intensity levels are deemed not to be evenly distributed, a nonlinear gamma correction factor is computed as indicted previously. This generally involves first determining whether there is a significant peak in the lower side, upper side, or both sides of the linearly expanded pixel intensity level histogram. A peak is considered significant if the number of pixels assigned to the bins of the histogram around the peak pixel intensity level is larger than the average. A significant peak determined to be in the lower side of the histogram, and which exhibits the lowest intensity level in cases where there are more than one, is designated as the low peak. Similarly, a significant peak determined to be in the upper side of the histogram, and which exhibits the highest intensity level in cases where there are more than one, is designated as the high peak. In addition to identifying the low and high peaks, the 25 percentile and 75 percentile intensity levels are computed from the linearly expanded pixel intensity level histogram, and used along with the previously computed 50 percentile (i.e. median) intensity level, to establish the gamma correction factor. More particularly, the gamma correction factor is established using the foregoing information as follows. When the median intensity level is greater than the maximum possible level multiplied by 0.50 plus the intensity tolerance factor:

(1) the correction factor is set to 1 if the low peak is less than one-eighth the maximum possible intensity level and the median intensity level is greater than or equal to three-quarters the maximum possible intensity level;

(2) the correction factor is set to the log of 0.125 divided by the log of the low peak divided by the maximum possible intensity level if the low peak is less than one-eighth the maximum possible intensity level and the median intensity level is less than three-quarters the maximum possible intensity level;

(3) when the low peak is greater than one-eighth the maximum possible intensity level and the median intensity level is greater than three-quarters the maximum possible intensity level, the correction factor is interpolated between 1 and a prescribed maximum value if the 75 percentile intensity level is between the maximum possible intensity level, and seven-eighths the maximum possible intensity level;

(4) when the low peak is greater than one-eighth the maximum possible intensity level and the median intensity level is greater than three-quarters the maximum possible intensity level, and 75 percentile intensity level is less than or equal to seven-eighths the maximum possible intensity level, the correction factor is either set to the log of 0.5 divided by the log of the median intensity level divided by the maximum possible intensity level, or in an alternate embodiment set to the log of 0.55 divided by the log of the median intensity level divided by the maximum possible intensity level except that the factor is limited to at most the prescribed maximum correction value. This alternate embodiment generally reduces the difference between the corrected image and the original image, thereby providing a more psychologically pleasing correction to a typical user; and (5) in all other cases, the correction factor is set to 1 to indicate that no correction is necessary.

Conversely, when the median intensity level is less than the maximum possible level multiplied by 0.50 less the intensity tolerance factor:

(1) the correction factor is set to 1 if the high peak is greater than seven-eighths the maximum possible intensity level;

(2) the correction factor is set to $$\gamma = 1 - \frac{Q_{0.25}}{L/8}(1 - \gamma_{min})$$

whenever the 25 percentile intensity level is less than or equal to one-eighth the maximum possible intensity level, where $\gamma$ is the correction factor, L is the maximum possible intensity level, $Q_{0.25}$ is the 25 percentile intensity level and $\gamma_{min}$ is a prescribed minimum correction factor value; and (3) in all other cases, the correction factor is set to the log of 0.5 divided by the log of the median intensity level divided by the maximum possible intensity level, except that the factor is limited to at least the prescribed minimum correction factor value.

It is noted that whenever gamma correction results in an overall brightening of the image, the color saturation levels of each color channel of each pixel of the image can be boosted by a desired amount to offset a typically perceived effect that the colors have been washed out. This boosting can entail varying the degree to which the color saturation levels of the image pixels are boosted between about 25 percent to less than 1 percent, in proportion to the degree of brightening.

It is further noted that while tested embodiments of present exposure correction system and process employed the foregoing gamma function, other functions such as splines, can be used as well without significant adverse effect.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

FIGS. 2(a)-(b) are images illustrating the results of the application of the present automatic exposure correction technique.

FIGS. 4(a)-(b) are images illustrating the results of the application of the present automatic color correction technique.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
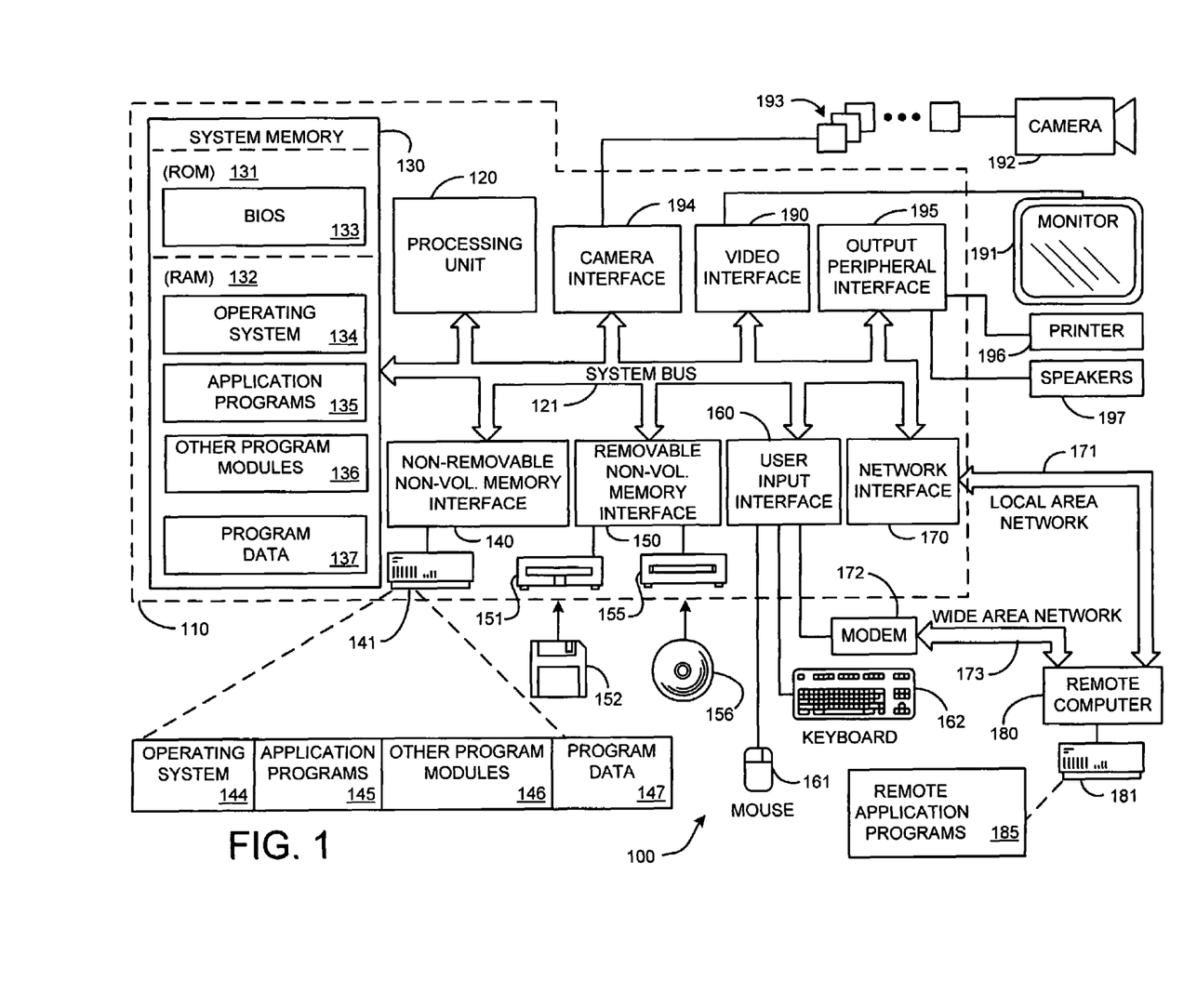
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 The Automatic Color and Exposure Correction System and Process

The exemplary operating environment having now been discussed, the remaining part of this description section will be devoted to a description of the program modules embodying the invention. Generally, the system and process according to the present invention involves two techniques for users to improve the appearance of imperfectly taken digital images or digitized photographs or frames of a video (hereinafter collectively referred to as an image). These techniques are automatic exposure correction and automatic color correction. The automatic exposure correction technique generally measures the average intensity of all of the pixels and can adjust the entire image pixel by pixel to compensate for over- or under-exposure. The automatic color correction technique generally takes information from within an image to determine true color characteristics, and improves the color in improperly colored pixels. These techniques are stand alone in that each can be applied to an image exclusive of the other, although it is envisioned that they would be packaged together such that a user activates one program which then automatically corrects both the exposure and color of an image. It does not matter which technique is applied first, however it is noted that in tested embodiments color correction was done first followed by exposure correction.

2.1 Automatic Exposure Correction

Figures 2A, 2B:
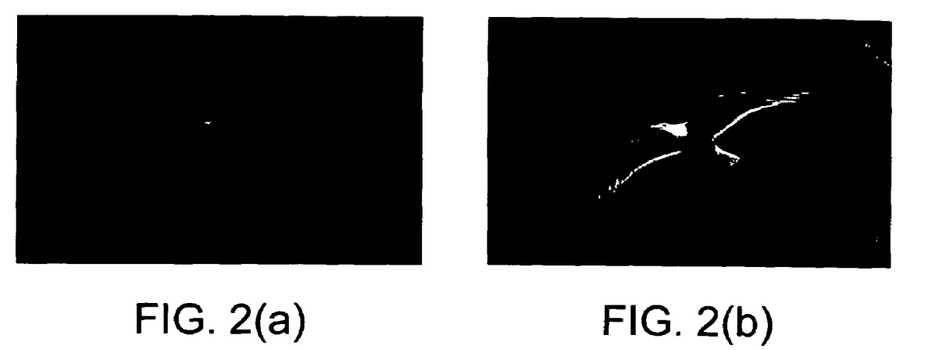
FIG. 2(a) depicts a seagull in an image that is underexposed.
FIG. 2(b) shows the same image after having the exposure corrected.

Automatic exposure correction according to the present system and process is used to better reveal the details captured in an image which is under or over exposed. The technique is based on histogram processing, and generally involves an initial linear transformation, which is followed, if necessary, with a nonlinear gamma correction in order to achieve the best result. In some cases a color saturation boost procedure is also used. The results of the application of the present automatic exposure correction technique is shown in the before and after images found in FIGS. 2(a)-(b). FIG. 2(a) depicts a seagull in an image that is underexposed. FIG. 2(b) shows the same image after having the exposure corrected in accordance with the present technique.

Figure 3:
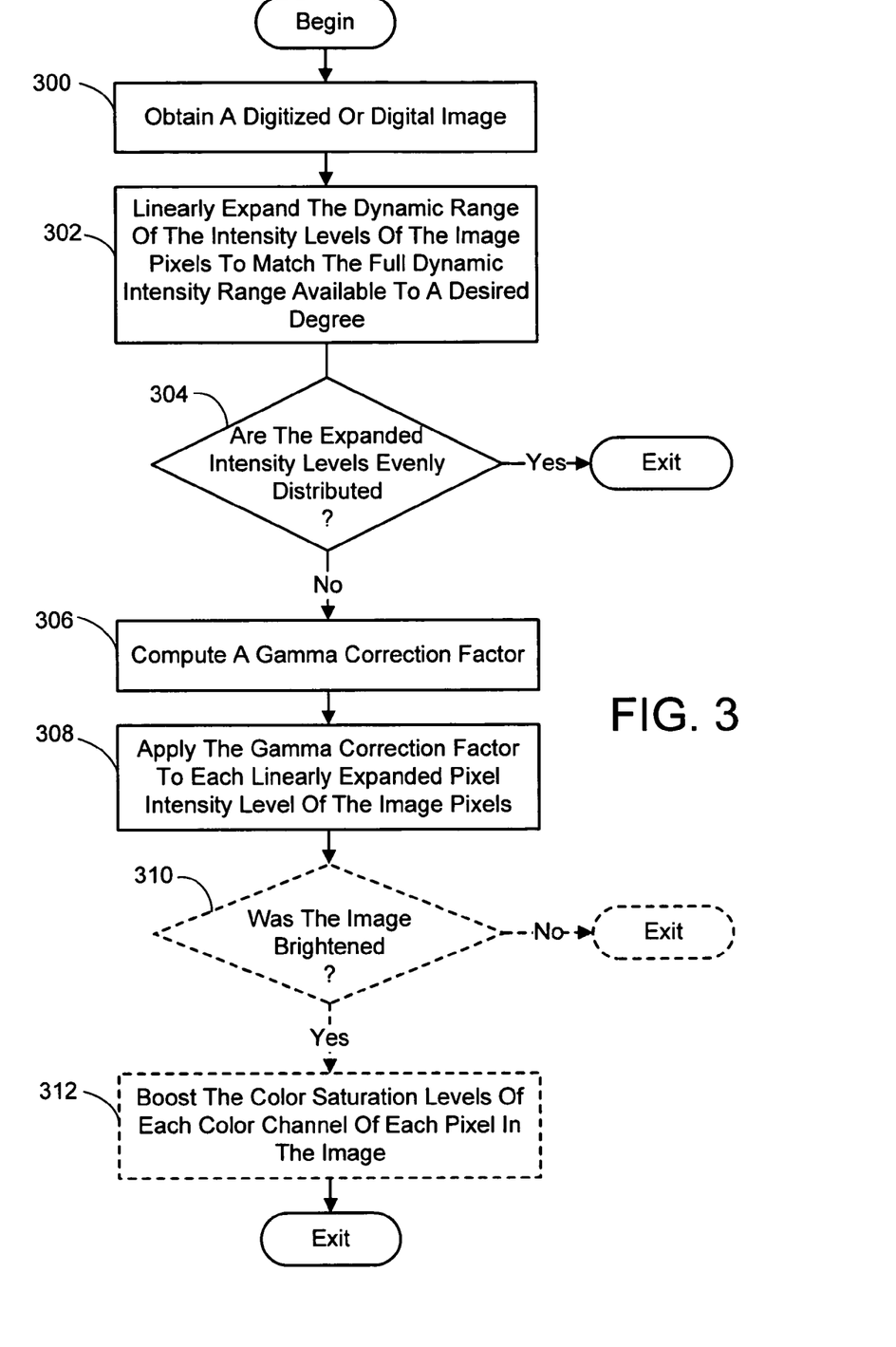
FIG. 3 is a flow chart diagramming an overall process for correcting the exposure of an image in accordance with the present invention.

More particularly, as outlined in the flow diagram in FIG. 3, the general process for implementing automatic exposure correction in accordance with the present invention involves obtaining a digitized or digital image which a user wants to improve by correcting the exposure levels of the image pixels (process action 300). The dynamic range of the intensity levels of the image pixels is then linearly expanded so as to match the full dynamic intensity range available to a desired degree (process action 302). The desired degree of matching refers to potential tailoring of how aggressively the exposure correction is performed and will be discussed in more detail shortly. Once the pixel intensity levels have been linearly expanded, it is determined if the expanded levels are evenly distributed (process action 304). If so, no further correction is required and the process ends. However, if it is found that the levels are not evenly distributed, then a non-linear gamma correction is performed by computing a gamma correction factor (process action 306) and applying it to each linearly expanded pixel intensity level (process action 308) to further correct the exposure of each pixel of the image. Optionally, once the gamma correction is complete, it can be determined if the exposure correction has resulted in an overall brightening of the image (optional process action 310). If not, the process ends. However, if the image was brightened, the color saturation levels of each color channel of each pixel of the image is boosted (optional process action 312). In tested embodiments of the exposure correction procedure, the degree of boosting was varied depending on the amount of brightening as will also be explained in more detail below. It is noted that the optional nature of the last two process actions is indicated by using dashed lines in the flow diagram of FIG. 3.

Each of the foregoing phases of the present exposure correction system and process will now be described separately in the sub-sections to follow.

2.1.1 Linear Intensity Correction

A histogram of the pixel intensities is computed as a discrete function $h(r_k)=n_k$, where $r_k$ is the kth intensity level and $n_k$ is the number of pixels in the image having intensity level $r_k$. Given the intensity histogram, the lower (bottom) and upper (top) intensity levels, denoted by B and T, respectively, are computed. It is noted these are not the actual highest and lowest values as outlying intensity values may exist in the image being corrected. Rather, the lower and upper intensity levels represent the lowest and highest intensity levels that are still consistent with the overall distribution of intensity values in the image. More particularly, B is determined such that, $$\sum_{l=0}^{B-1} n_l < pN \text{ and } \sum_{l=0}^{B} n_l \geq pN, \tag{1}$$

where l is the intensity level in a range [0, L], N is the total number of pixels, and p is a small number chosen to eliminate the impact of noise at the top and bottom of the intensity range including eliminating saturated pixels. Similarly, T is determined such that, $$\sum_{l=T}^{L-1} n_l \geq pN \text{ and } \sum_{l=T+1}^{L-1} n_l < pN. \tag{2}$$

In tested embodiments of the present system and process employing a pixel intensity range of 0 to 255 integer levels, p was empirically chosen to be about 0.5%. This represents an amount just slightly larger than one intensity level. It is noted that if more than 256 intensity levels are employed, the value of p should remain about 0.5%. However, if less than 256 intensity levels are employed, then the value of p should be adjusted to represent about 1 intensity level. For example, if 64 intensity levels are employed, the value of p should be about 0.2%.

In designing the present system and process, it was assumed that a well-exposed image is defined as one that, among other things, uses the whole dynamic range [0, L]. Thus, once the existing values of the lowest and highest intensity level (i.e., B and T) are computed, the expected values for these levels after correction (denoted by $\hat{B}$ and $\hat{T}$), is computed assuming the intensity range is expanded. This is accomplished using the following equations:

$$\hat{B}=(1-\alpha)B, \text{ and} \tag{3}$$

$$\hat{T}=\alpha(L-1)+(1-\alpha)T. \tag{4}$$

The factor α represents a so-called safeness parameter that controls how conservatively the correction is performed. No correction will be performed if α=0, and the maximum correction will be performed if α=1. This factor can be prescribed, or user specified. If prescribed, since this is an automatic tool, the value should be chosen so as to be conservative in the correction. This may not achieve the best correction, but should have the effect of not making any image look worse. For example, a prescribed value for α of about 0.75 would be a good conservative choice. However, a user specified value may be a better way go since there will be exceptions to the assumption that an image should fill the entire dynamic intensity range available because the photographer may want to achieve certain effects. For example, in a portrait it is common to make a large fraction of the background black. Thus, expanding the dynamic range may lighten the background unacceptably. In such a case, the user would specify a low value for α. Thus, a user specified safeness parameter provides a way to tailor the amount of correction to the circumstances of the image.

Once the existing and expected values for the high and low intensity levels have been computed, a linear intensity correction transformation is established and each old intensity level l is mapped to a new intensity level l̂. Specifically, the transformation takes the form of:

$$\hat{l} = al + b \tag{5}$$

where, $$a = (\hat{T} - \hat{B})/(T - B), \text{ and} \tag{6}$$

$$b = (\hat{B}T - \hat{T}B)/(T - B) \tag{7}$$

2.1.2 Gamma Correction

Another assumption made in designing the present system and process is that a well-exposed image is one in which the bright and dark pixels are distributed evenly; that is, the median of the intensity in a picture is expected to be around L/2. If this is not the case, then a correction is made. To accomplish this task it is first determined if the pixels are evenly distributed after completing the previously described linear transformation. If they are not, then a nonlinear gamma correction is applied in order to achieve the best overall exposure. Essentially, for generally overexposed images, the gamma correction has the effect of darkening the higher intensity pixel more than lower intensity pixels. This results in the brighter overexposed areas being significantly darken, while the darker areas are less affected so that there is no substantial loss of detail in the darker areas of the image. Conversely, for generally under exposed images, the gamma correction has the effect of brightening the lower intensity pixels more than the higher intensity pixels. This results in the darker underexposed areas being significantly brightened, while the brighter areas are less affected to avoid saturating the pixels in the bright areas.

The distribution of pixels exhibiting darker and lighter intensities is assessed as follows. First, a linearly transformed histogram $\tilde{h}(r_k)$ is computed such that, $$\tilde{h}(ar_k + b) = h(r_k). \tag{8}$$

Next, the 50-percentile (median) intensity level is computed, denoted by $Q_{0.5}$ from $\tilde{h}(r_k)$. More particularly $Q_p$ (p=0.5) is determined such that, $$\sum_{l=0}^{Q_p - 1} \tilde{h}(l) < pN, \text{ and} \tag{9}$$

$$\sum_{l=0}^{Q_p} \tilde{h}(l) \geq pN. \tag{10}$$

It is then determined if, $$|Q_{0.5} - L/2| \leq 0.05L. \tag{11}$$

If so, the distribution of darker and lighter pixels is deemed to be well balanced and processing stops. It is noted a factor of 0.05 was chosen empirically to provide a small tolerance range, which even given noise there is a high confidence that the darker and lighter pixels are balanced. As such, other values for this factor should be chosen if the noise characteristics of the image dictates a larger value or allow for a smaller value. It is also noted that the value of this factor is dependent of the number of intensity levels, which in the case of the tested embodiments was 256. If more or less intensity levels are employed, the value of the factor should be adjusted proportionally.

If, however, Eq. 11 is found not to be the case, the aforementioned nonlinear gamma correction is applied as follows. First, it is determined if there is a significant peak in the lower side of the linearly transformed histogram, or a significant peak in the upper side of this histogram. A peak is considered significant if the number of pixels around the peak is larger than the average. A peak P is significant if and only if, $$\sum_{l=P-D}^{P+D} \tilde{h}(l) \geq \frac{2D+1}{L} N, \tag{12}$$

where D is the neighborhood size. In operation, Eq. 12 is used to check each intensity level for a peak. The peak (if any) that is associated with the lowest intensity level is designated as $P_{low}$ and the peak (if any) associated with the highest intensity level is designated as $P_{high}$.

The aforementioned neighborhood size is chosen so as to be large enough exclude noise in any one intensity level from skewing the results, while at the same time not so large that a actual peak is lost in the averaging across intensity levels. In tested embodiments using 266 intensity levels, a value of D between 3 and 5 was found to be acceptable with 4 being preferred. It should be noted, however, that if fewer or more intensity levels are employed, the value of D should be adjusted proportionally.

In addition to finding the peaks, the 25-percentile and 75-percentile intensity levels are computed, denoted by $Q_{0.25}$ and $Q_{0.75}$, respectively, from $\tilde{h}(r_k)$. More particularly $Q_p$ (p=0.25 or 0.75) is determined using Eqs. (9) and (10). Thus, there is now a value computed for $Q_{0.25}$, $Q_{0.5}$ and $Q_{0.75}$.

In cases where $Q_{0.5} > 0.55L$, an appropriate gamma γ is established as follows, depending on the circumstances.

1. If the lower peak $P_{low} < L/8$ and $Q_{0.5} \geq 3L/4$, set γ=1 because it is hard to correct both ends with one gamma correction function.
2. If the lower peak $P_{low} < L/8$, but $Q_{0.5} < 3L/4$, set γ=log(1/8)/log($P_{low}/L$) so as to map the lower peak to L/8 to make the details around the lower peak more visible, at the expense of making the overall image even brighter.
3. If the lower peak $P_{low} \leq L/8$ and $Q_{0.5} > 3L/4$, and also $Q_{0.75} > 7L/8$, the photographer may have some special intention to make the picture very bright. To account for this, γ is interpolated between 1 (i.e., no correction) and $\gamma_{max}$ as follows:

$$\gamma = 1 + \frac{L - Q_{0.75}}{L/8}(\gamma_{max} - 1). \quad (13)$$

Here, $\gamma_{max}$ is the maximum value allowed in for this gamma correction, and can range between 1.2 and 2.5. In tested embodiments $\gamma_{max}$ was set to 1.5 with satisfactory results.

4. If the lower peak $P_{low} \geq L/8$ and $Q_{0.5} > 3L/4$, and also $Q_{0.75} \leq 7L/8$, gamma can be set so that:

$$\gamma = \log(0.5)/\log(Q_{0.5}/L) \quad (14)$$

so as to map $Q_{0.5}$ to L/2. However, in one embodiment of the present system and process, gamma is set so that:

$$\gamma = \log(0.55)/\log(Q_{0.5}/L) \quad (15)$$

(note the "0.55" in the equation) to make the corrected image brighter than if the Eq. (14) is used. Furthermore, γ is capped by $\gamma_{max}$. It was found that these modifications to Eq. (14) reduced the difference between the corrected image and the original image. Thus, while the gamma correction using Eq. (15) may not be optimal, the change it causes is less dramatic, thereby providing a more psychologically pleasing correction to the typical user.

4. If none of the foregoing special cases apply, set γ=1.

Conversely, in cases where $Q_{0.5} < 0.45L$, an appropriate gamma γ is established as follows, depending on the circumstances.

1. If the upper peak $P_{high} > 7L/8$, set γ=1 because the upper peak would be washed out if an attempt is made to make the image brighter.

2. If $Q_{0.25} \leq L/8$, the photographer may have some special intention to make the picture very dark. To account for this, γ is set to 1 (no correction) if $Q_{0.25}=0$ and γ is set to $\gamma_{min}$ if $Q_{0.25}=L/8$. For values of $Q_{0.25}$ between 0 and L/8, γ is interpolated between $\gamma_{min}$ and 1. More particularly, the following equation can be used to compute γ:

$$\gamma = 1 - \frac{Q_{0.25}}{L/8}(1 - \gamma_{min}). \quad (16)$$

Here, $\gamma_{min}$ is the minimum value allowed in for this gamma correction, and can range between 0.4 and 0.56. In tested embodiments $\gamma_{min}$ was set to 0.48 with satisfactory results.

3. If none of the foregoing special cases apply, as in the case where $Q_{0.5} > 0.55L$, gamma can be set so that:

$$\gamma = \log(0.5)/\log(Q_{0.5}/L) \quad (17)$$

to map $Q_{0.5}$ to L/2. However, if this results in $\gamma < \gamma_{min}$, then γ is set equal to $\gamma_{min}$.

Once the gamma correction factor γ has been established, it is applied to correct each linearly transformed pixel intensity values l using the following equation:

$$\hat{l}_{\substack{gamma \\ corrected}} = \left(\frac{l}{L-1}\right)^{\gamma}(L-1). \quad (18)$$

It is noted that while tested embodiments of present exposure correction system and process employed the foregoing gamma function, other functions such as splines, can be used as well without significant adverse effect.

2.1.3 Color Saturation Boost

Although the foregoing gamma correction does not alter the values of hue and saturation of the image, it usually affects the relative appearance of the colors (i.e., the overall color perception), especially when the image is made brighter. Specifically, the colors appear to wash out when the image is brightened. This perception issue can be resolved by boosting the color saturation levels of the pixels in an image whenever γ<1, thereby indicating that the gamma correction brightened the image. In tested embodiments, it was found that an increase in color saturation levels of between 0 and 25%, depending on the value of the gamma correction factor computed for the image produced the desired effect of deepening the appearance of the colors. Specifically, a full 25% boost is applied to each pixel if $\gamma = \gamma_{min}$, and a progressively smaller boost is applied the closer γ gets to 1. In operation, this is accomplished by applying the following equation to each color channel of each pixel in the image:

$$\frac{1 - \gamma}{1 - \gamma_{min}} \times 1.25. \quad (19)$$

2.2 Automatic Color Correction

Figures 4A, 4B:
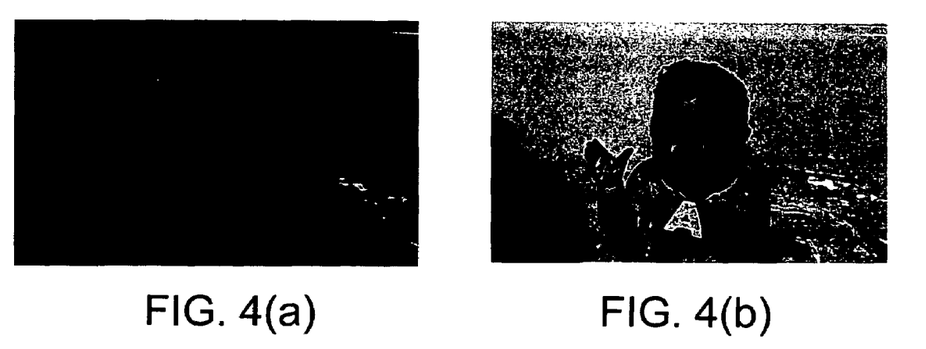
FIG. 4(a) depicts a baby in an image that is improperly colored.
FIG. 4(b) shows the same image after the color is corrected.

Automatic color correction according to the present system and process takes information from within a photo to determine true color characteristics, and improves the color in improperly colored pixels. The technique is based on histogram processing for each of the primary color channels (e.g., R, G, B) and the luminance (Y) channel, and generally involves a linear transformation designed to balance the dynamic color range of the color channels. The results of the application of the present automatic color correction technique is shown in the before and after images found in FIGS. 4(a)-(b). FIG. 4(a) depicts a baby in an image that is improperly colored. FIG. 4(b) shows the same image after the color is corrected in accordance with the present technique.

Figure 5:
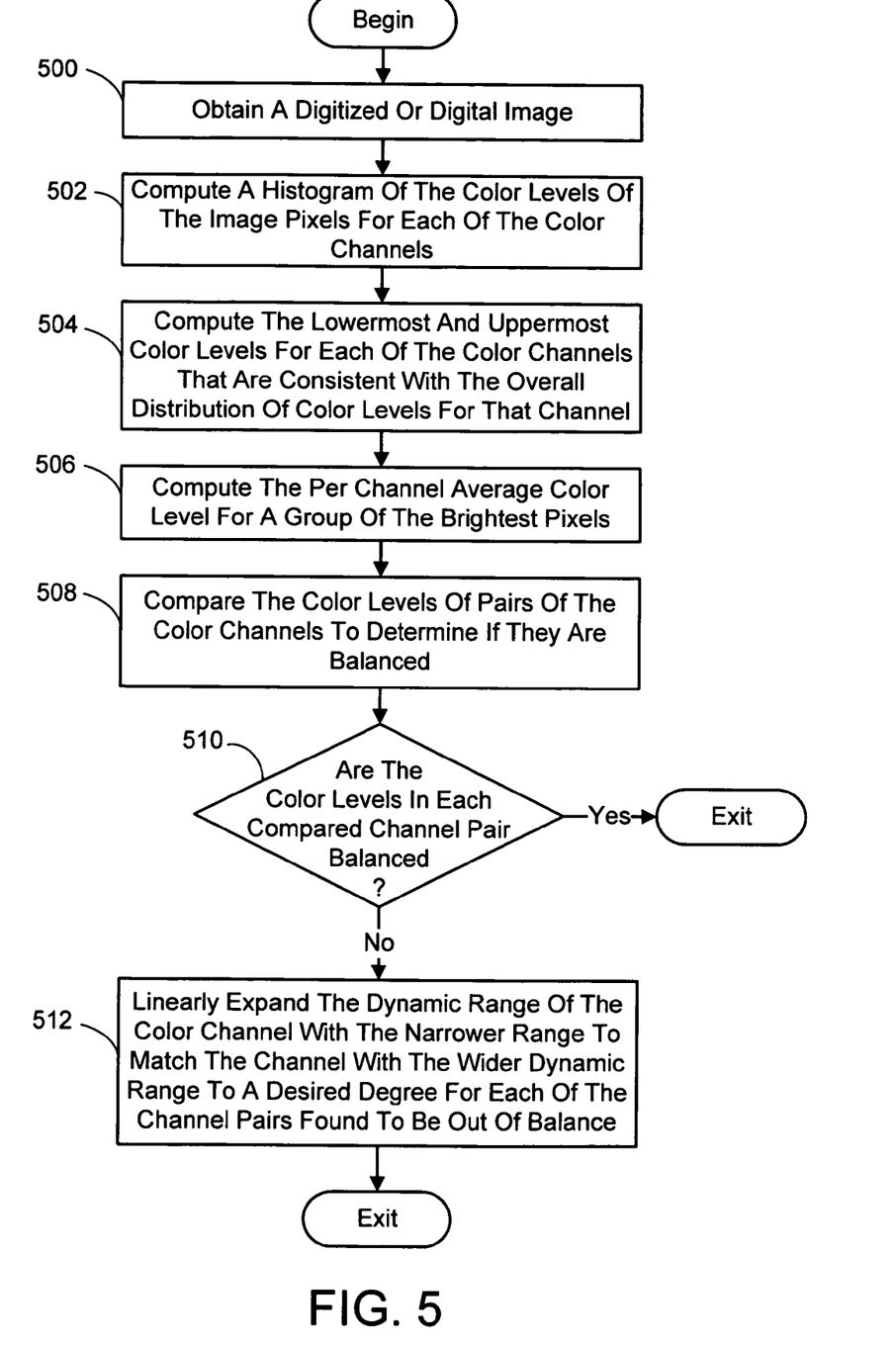
FIG. 5 is a flow chart diagramming an overall process for correcting the color of an image in accordance with the present invention.

More particularly, as outlined in the flow diagram in FIG. 5, the general process for implementing automatic color correction in accordance with the present invention involves obtaining a digitized or digital image which a user wants to improve by correcting the color levels of the image pixels (process action 500). A histogram of the color levels of the image pixels for each of the color channels is then computed (process action 502), followed by computing the lowermost and uppermost color levels for each of the color channels that are consistent with the overall distribution of color levels for that channel (process action 504). Next, the per channel average color level for a group of the brightest pixels is computed (process action 506). The lowermost and uppermost color levels for each of the color channels and the per channel average color levels are used to compare the color levels of pairs of the color channels (process action 508) to determine if they are balanced (process action 510). A pair of color channels is considered balanced if the dynamic range of their color levels match within a prescribed tolerance, as will be described in more detail shortly. If the color channels are balanced, then no correction is required and the process ends. However, if any channel pair is found to be out of balance, then the dynamic range of the color channel with the narrower range is linearly expanded to match the channel with the wider dynamic range to a desired degree (process action 512). The desired degree of matching refers to potential tailoring of how aggressively the color correction is performed and will be discussed in more detail below.

Each of the foregoing phases of the present color correction system and process will now be described in more detail.

A histogram for each of the primary color channels of the pixels in the image (which for this discussion will be assumed to be the R, G, B channels) is computed as discrete functions $h_R(r_k)=n_k$, $h_G(r_k)=n_k$, $h_B(r_k)=n_k$, where $h_R$ is the histogram for the red color channel, $h_G$ is the histogram for the green color channel, $h_B$ is the histogram for the blue color channel, $r_k$ is the kth color level in one of the color channels and $n_k$ is the number of pixels in the image having color level $r_k$ for the associated color channel. Given the color channel histograms, the lower (bottom) and upper (top) color levels for each of the R, G, and B channels, denoted by $B_R$, $B_G$, $B_B$ and $T_R$, $T_G$, $T_B$, respectively, are computed. It is noted these are not the actual highest and lowest values as outlying values may exist in the image being corrected. Rather, the lower and upper color levels for each channel represent the lowest and highest levels that are still consistent with the overall distribution of color levels in the image. More particularly, $B_R$, $B_g$, and $B_b$, are each determined using the following equation:

$$\sum_{l=0}^{B-1} n_l < pN \text{ and } \sum_{l=0}^{B} n_l \geq pN, \quad (20)$$

where l is the color level in a range [0, L], N is the total number of pixels, and p is a small number chosen to eliminate the impact of noise at the top and bottom of the color level range. Similarly, $T_R$, $T_g$, and $T_b$ are each determined using the following equation:

$$\sum_{l=T}^{L-1} n_l \geq pN \text{ and } \sum_{l=T+1}^{L-1} n_l < pN. \quad (21)$$

In tested embodiments of the present system and process employing a pixel color level range of 0 to 255 integer levels, p was empirically chosen to be about 0.5%. This represents an amount just slightly larger than one intensity level. It is noted that if more than 256 intensity levels are employed, the value of p should remain about 0.5%. However, less than 256 intensity levels are employed, then the value of p should be adjusted to represent about 1 intensity level. For example, if 64 intensity levels are employed, the value of p should be about 0.2%.

Next, a histogram of the Y channel of the pixels in the image is computed, denoted by $h_y(r_k)$. The Y channel of a pixel, which is also called the luminance channel, is computed from the R, G, B color channels as follows:

$$Y = \frac{76R + 150G + 30B}{256} \quad (22)$$

for an image having 256 levels in each color channel. For images having more or less levels, Y is computed proportionally.

In addition to the Y channel histogram, the average color associated with each intensity Y level $r_k$, denoted by $c_k=(R_k,$ $G_k, B_k)$, is also computed. More particularly, computing $c_k$ for a particular intensity Y level is accomplished as follows. First, the number of pixels in the image that exhibit an R channel having the intensity Y level under consideration is divided by the total number of pixels in the image exhibiting that intensity Y level in any of the color channels to compute $R_k$. Similarly, the number of pixels in the image that exhibit a G channel having the intensity Y level under consideration is divided by the total number of pixels in the image exhibiting that intensity Y level in any of the color channels to compute $G_k$. And finally, the number of pixels in the image that exhibit a B channel having the intensity Y level under consideration is divided by the total number of pixels in the image exhibiting that intensity Y level in any of the color channels to compute $B_k$.

Given the Y channel histogram $h_y(r_k)$ and the average color associated with each intensity Y level $c_k$, the average color of brightest pixels is computed as follows:

$$c_{top} = (R_{top}, G_{top}, B_{top}) = \sum_{k=P}^{L-1} h_Y(r_k)c_k \Big/ \sum_{k=P}^{L-1} h_Y(r_k), \quad (23)$$

where P is determined such that, $$\sum_{l=P-1}^{L-1} n_l < pN \text{ and } \sum_{l=P}^{L-1} n_l \geq pN. \quad (24)$$

Here again, in tested embodiments of the present system and process employing a pixel color level range of 0 to 255 integer levels, p was empirically chosen to be about 0.5%.

An assumption is made in the design of the present system and process that the brightest pixels correspond to white/grey or glossy areas, and thus their color reveals the actual color of the light source. This is why the average color of the brightest pixels is computed. Further it is assumed that the overall image color is consistent with the color of the light source. Given this latter assumption, the R and B pixel color channels can be balanced with the G channel to improve the color of the image. The G channel is used as the reference for balancing because in a typical Bayer CCD chip, there are twice as many G pixels than R and B pixels, and the G value is considered to be more reliable. The first phase of this balancing involves ensuring that the assumptions are valid, and to determine what, if any, balancing is required. To this end, it is first checked whether the R channel is balanced with the G channel. This involves the following considerations:

1. If $|R_{top}-G_{top}|<\tau(R_{top}+G_{top})/2$, or $|B_R-B_G|<\tau(B_R+B_G)/2$, then the R and G channels are balanced and no change is required. In tested embodiments of the present system and process, τ was set equal to 2.5%. This value was chosen empirically to provide a small tolerance range which even given noise there is a high confidence that the R and G channels are balanced. As such, other values for τ should be chosen if the noise characteristics of the images dictate a larger value or allow for a smaller value. It is also noted that the value of τ is dependent of the number of color levels, which in the case of the tested embodiments was 256. If more or less color levels are employed, the value of τ should be adjusted proportionally.
2. If $R_{top}>G_{top}$ and $B_R>B_G$, then the dynamic range of the G channel is to be increased to match the R channel.

3. If $R_{top}<G_{top}$ and $B_R<B_G$, then the dynamic range of the R channel is to be increased to match the G channel.
4. If none of the foregoing conditions apply, then the R and G channels are considered balanced because the image color is not consistent with the color of the brightest pixels. As the foregoing assumptions are not valid, no corrective action is taken.

It is next checked whether the B channel is balanced with the G channel. This involves the following considerations:
1. If $|B_{top}-G_{top}|<\tau(B_{top}+G_{top})/2$, or $|B_B-B_G|<\tau(B_B+B_G)/2$, then the B and G channels are balanced and no change is required.
2. If $B_{top}>G_{top}$ and $B_B>B_G$, then the dynamic range of the G channel is to be increased to match the B channel.
3. If $B_{top}<G_{top}$ and $B_B<B_G$, then the dynamic range of the B channel is to be increased to match the G channel.
4. If none of the foregoing conditions apply, then the B and G channels are considered balanced because the image color is not consistent with the color of the brightest pixels. As the foregoing assumptions are not valid, no corrective action is taken.

It is noted that while in the foregoing procedure the R channel/G channel balance was assessed first followed by the B channel/G channel balance. This need not be the case. Rather the B channel/G channel balance could be assessed first followed by the R channel/G channel balance. In addition, the assumption that the G channel data is more reliable need not be adopted. In such a case, another of the color channels could be employed as the reference channel instead.

If it is determined in the foregoing analysis that a color channel's dynamic range is to be increased to match another's range, this can generally be accomplished by computing the appropriate new top and bottom levels for the channel that is to be changed, and then linearly stretching the color range of that channel. More particularly, the following procedure is employed to stretch the color range of a channel. For the purposes of this description it will be explained how the B channel is increased to match the G channel. However, it is to be understood that the same procedure can be used stretch the dynamic color range of any channel to match another channel.

Given the previously determined values for by $B_G$, $T_G$ and $B_B$, $T_B$:

$$\hat{B}_G = (1-\alpha)B_G, \text{ and} \tag{25}$$

$$\hat{T}_G = \alpha(L-1)+(1-\alpha)T_G. \tag{26}$$

Eqs. (25) and (26) provide a way to control how aggressive the correction is by using a safeness parameter $\alpha$ to adjust the bottom and top levels of the color channel that is to be matched. No matching will be performed if $\alpha=0$, and the dynamic range of the color channel will be fully matched if $\alpha=1$. This factor can be prescribed, or user specified. If prescribed, since this is an automatic tool, the value should be chosen so as to be conservative in the correction. This may not achieve the best correction, but should have the effect of not making any image look worse. For example, a prescribed value for $\alpha$ of about 0.75 would be a good conservative choice. However, a user specified value may be a better way go since there will be exceptions to the assumption that an image should fill the entire dynamic intensity range available because the photographer may want to achieve certain effects. Thus, a user specified safeness parameter provides a way to tailor the amount of correction to the circumstances of the image.

Once the safeness parameter has been applied, a linear color range correction transformation is established and each old color level l of the B channel is mapped to a new color level $\tilde{l}$. Specifically, the transformation takes the form of:

$$\tilde{l} = al+b \tag{27}$$

where, $$a = (\hat{T}_G - \hat{B}_G)/(T_B - B_B), \text{ and} \tag{28}$$

$$b = (\hat{B}_G T_B - \hat{T}_G B_B)/(T_B - B_B). \tag{29}$$

Wherefore, what is claimed is:

1. A computer-implemented process for correcting the color of improperly colored pixels of an image having multi-level red (R), green (G), and blue (B) color channels, comprising using a computer to perform the following process actions:
   computing a histogram of the color levels of the image pixels for each of the color channels;
   computing the lowermost and uppermost color levels for each of the color channels that are consistent with the overall distribution of color levels for that channel;
   computing the per channel average color level for a group of the brightest pixels;
   comparing the color levels of the G and R color channel pair and the G and B color channel pair to determine if the color levels in each compared pair is balanced; and
   whenever the color levels of either compared color channel pair are determined not to be balanced, linearly expanding the dynamic range of the color channel with the narrower range to match the channel with the wider dynamic range to a desired degree for each of said channel pairs found to be out of balance.

2. The process of claim 1, wherein the process action of computing the lowermost and uppermost color levels for each of the color channels that are consistent with the overall distribution of color levels for that channel, comprises, for each color channel in turn, the actions of:
   computing the lowermost level as the level wherein,
     the sum of the number of pixels exhibiting a level within a prescribed range of levels extending from the lowest level possible to the unknown lowermost level, less one level, is less than the total number of pixels in the image multiplied by a tolerance factor designed to eliminate the impact of noise on the pixels color values, and
     the sum of the number of pixels exhibiting a level within a prescribed range of levels extending from lowest level possible to the unknown lowermost level, is greater than or equal to the total number of pixels in the image multiplied by the tolerance factor; and
   computing the uppermost level as the level wherein,
     the sum of the number of pixels exhibiting a level within a prescribed range of levels extending from the unknown uppermost level to the highest level possible, is greater than or equal to the total number of pixels in the image multiplied by said tolerance factor, and
     the sum of the number of pixels exhibiting a level within a prescribed range of levels extending from the unknown uppermost level, plus one level, to the highest level possible, is less than the total number of pixels in the image multiplied by the tolerance factor.

3. The process of claim 1, wherein the process action of computing the per channel average color level for a group of the brightest pixels, comprises the actions of:

computing a histogram of the luminance (Y) channel of the pixels in the image;

computing the average color associated with each color level as a vector having an element for each color channel that represents the percentage of the number of pixels having that color channel exhibiting a particular Y intensity level as compared to all the pixels of any color channel exhibiting the Y intensity level under consideration;

computing the sum of the average color of a color level multiplied by the number of Y channel pixels associated with that level for each level within a particular range representing the group of the brightest pixels, divided by the sum of the number of Y channel pixels for each level within the same range, wherein the particular range is computed as being between the uppermost level of the Y channel that is still consistent with the overall distribution of levels for that channel and the maximum level possible for that channel;

designating the resulting vector as the average color level vector for said group of the brightest pixels.

4. The process of claim 3, wherein the process action of computing the particular level range representing the group of the brightest pixels as being between the uppermost level of the Y channel that is still consistent with the overall distribution of levels for that channel and the maximum level possible for that channel, comprises the actions of computing the uppermost level for the Y channel as the level wherein:

the sum of the number of pixels exhibiting a level within a prescribed range of levels extending from the unknown uppermost level, plus one level, to the highest level possible, is less than the total number of pixels in the image multiplied by a tolerance factor designed to eliminate the impact of noise on the pixels values; and the sum of the number of pixels exhibiting a level within a prescribed range of levels extending from the unknown uppermost level to the highest level possible is greater than or equal to the total number of pixels in the image multiplied by the tolerance factor.

5. The process of claim 1, wherein the process action of determining if the color levels of a compared color channel pair are balanced, comprises the actions of:

ascertaining if the dynamic color level ranges of the channel pair match within a prescribed tolerance; and whenever the dynamic color level ranges of the channel pair do not match within the prescribed tolerance, designating the color levels of the color channel pair to be out of balance.

6. The process of claim 5, wherein the process action of ascertaining if the dynamic color level ranges of the channel pair match within the prescribed tolerance, comprises the actions of:

determining if the difference between the average color level of the group of the brightest pixels for the channel pair under consideration is less than their average multiplied by a prescribed tolerance value;

determining if the difference between the lowermost color levels of color channel pair is less than their average multiplied by the prescribed tolerance value; and whenever either of said differences is determined not to be less, designating that the dynamic color level ranges of the channel pair under consideration do not match within the prescribed tolerance.

7. The process of claim 1, wherein the process action of linearly expanding the dynamic range of the color channel with the narrower range to match the channel with the wider dynamic range to a desired degree, comprises an action of varying the degree to which the color channel with the narrower range is made to match the channel with the wider dynamic range between expanding the channel with the narrower range to match the full range of the channel with the wider range to no expansion at all, depending on the value of a safeness parameter.

8. The process of claim 7, wherein the safeness parameter is prescribed.

9. The process of claim 7, wherein the safeness parameter is user-specified.

10. The process of claim 1, wherein the process action of linearly expanding the dynamic range of the color channel with the narrower range to match the channel with the wider dynamic range to a desired degree, comprises the actions of:

computing new lowermost and uppermost levels for the channel with the wider dynamic color level range that reflect the degree to which it is desired for the channel with the narrower range to match the channel with the wider range, and employing the new lowermost and uppermost levels of the channel with the wider dynamic color level range and the lowermost and uppermost levels of the channel with the narrower range to establish a linear color correction transform that maps each old color level to a new color level;

applying the linear color correction transform to the color channel with the narrower range for each pixel of the image.

11. The process of claim 10, wherein the process action of linearly expanding the dynamic range of the color channel with the narrower range to match the channel with the wider dynamic range to a desired degree, comprises an action of varying the degree to which the color channel with the narrower range is made to match the channel with the wider dynamic range between expanding the channel with the narrower range to match the full range of the channel with the wider range to no expansion at all, depending on the value of a safeness parameter, and wherein the process action of computing new lowermost and uppermost levels for the channel with the wider dynamic color level range that reflect the degree to which it is desired for the channel with the narrower range to match the channel with the wider range, comprises the actions of:

computing the new lowermost color level for the channel with the wider dynamic color level range as $\hat{B}_{wider} = (1-\alpha)B_{wider}$, wherein $B_{wider}$ is the originally computed lowermost color level of the channel with the wider range, $\hat{B}_{wider}$ is the new lowermost color level of the channel with the wider range and $\alpha$ is the safeness parameter which varies from 0 to 1; and computing the new uppermost color level for the channel with the wider dynamic color level range as $\hat{T}_{wider} = \alpha(L-1)+(1-\alpha)T_{wider}$, wherein $T_{wider}$ is the originally computed uppermost color level of the channel with the wider range, $\hat{T}_{wider}$ is the new uppermost color level of the channel with the wider range and L is the maximum possible intensity level.

12. The process of claim 11, wherein the process action of employing the lowermost and uppermost levels of the channel with the narrower dynamic color level range and the new lowermost and uppermost levels of the channel with the wider range to establish a linear color correction transform, comprises an action of establish the linear color correction transform as $\hat{l} = al + b$, where, $l$ is the original pixel color level, $\hat{l}$ is the linearly corrected pixel color level, $a = (\hat{T}_{wider} - \hat{B}_{wider})/(T_{narrower} - B_{narrower})$, $b = (\hat{B}_{wider}T_{narrower} - \hat{T}_{wider}B_{narrower})/(T_{narrower} - B_{narrower})$, $B_{narrower}$ is the originally computed lowermost color level of the channel with the narrower range, and $T_{narrower}$ is the originally computed uppermost color level of the channel with the narrower range.

13. A system for improving the appearance of an image having multi-level red (R), green (G), and blue (B) color channels, comprising:
a general purpose computing device;
a computer program comprising program modules executable by the computing device, wherein the computing device is directed by the program modules of the computer program to,
compute a histogram of the color levels of the image pixels for each of the color channels;
compute the lowermost and uppermost color levels for each of the color channels that are consistent with the overall distribution of color levels for that channel;
compute the per channel average color level for a group of the brightest pixels;
compare the color levels of the G and R color channel pair and the G and B color channel pair to determine if the color levels in each compared pair are balanced; and
whenever the color levels of either compared color channel pair are determined not to be balanced, linearly expand the dynamic range of the color channel with the narrower range to match the channel with the wider dynamic range to a desired degree for each of said channel pairs found to be out of balance, to improve the color of improperly colored pixels of the image.

14. A system of claim 13, further comprising program modules for:
linearly expanding the dynamic range of the intensity levels of the image pixels so as to match the full dynamic intensity range available to a desired degree;
determining whether the linearly expanded intensity levels of the image pixels are evenly distributed; and
whenever the linearly expanded intensity levels of the pixels are determined not to be evenly distributed, applying a gamma correction factor to the linearly expanded intensity level of each pixel in the image to produce a corrected intensity value for each pixel and thereby improve the exposure of improperly exposed pixels of the image.

15. The system of claim 14, wherein the program module for linearly expanding the dynamic range of the intensity levels of the image pixels so as to match the full dynamic intensity range available to a desired degree, comprises a sub-module for varying the degree to which intensity levels of the image pixels are made to match the full dynamic intensity range available between expanding the dynamic range of the intensity levels to match the full dynamic intensity range available to no expansion at all, depending on the value of an exposure safeness parameter.

16. The system of claim 15, wherein the exposure safeness parameter is prescribed.

17. The system of claim 15, wherein the exposure safeness parameter is user-specified.

18. The system of claim 14, wherein the program module for linearly expanding the dynamic range of the intensity levels of the image pixels, comprises sub-module for:
computing a histogram of the intensity levels of the image pixels;
computing the lowermost and uppermost intensity levels that are consistent with the overall distribution of intensity levels in the image;
computing new lowermost and uppermost intensity levels that span the full dynamic intensity range available to a desired degree, and
employing the originally computed lowermost and uppermost intensity levels and the new lowermost and uppermost intensity levels to establish a linear intensity correction transform that maps the original intensity level of each pixel in the image to a linearly expanded intensity level;
applying the linear intensity correction transform to each pixel of the image.

19. The system of claim 14, further comprising a process action of, whenever the application of a gamma correction factor to the linearly expanded intensity level of each pixel in the image results in an overall brightening of the image, boosting the color saturation levels of each color channel of each pixel of the image by a desired amount.

20. The system of claim 19, wherein the sub-module for boosting the color saturation levels of each color channel of each pixel of the image by a desired amount, comprises a sub-module for varying the degree to which the color saturation levels of the image pixels are boosted between about 25 percent to less than 1 percent, in proportion to the degree of brightening.

21. The system of claim 13, wherein the program module for linearly expanding the dynamic range of the color channel with the narrower range to match the channel with the wider dynamic range to a desired degree, comprises an action of varying the degree to which the color channel with the narrower range is made to match the channel with the wider dynamic range between expanding the channel with the narrower range to match the full range of the channel with the wider range to no expansion at all, depending on the value of a color safeness parameter.

22. The process of claim 21, wherein the color safeness parameter is prescribed.

23. The process of claim 21, wherein the color safeness parameter is user-specified.

24. A computer-readable medium having computer-executable instructions for correcting the color of improperly colored pixels of an image having multi-level primary color channels, said computer-executable instructions comprising:
computing a histogram of the color levels of the image pixels for each of the color channels;
computing the lowermost and uppermost color levels for each of the color channels that are consistent with the overall distribution of color levels for that channel for that channel, said computation comprising, for each color channel in turn,
computing the lowermost level as the level wherein,
the sum of the number of pixels exhibiting a level within a prescribed range of levels extending from the lowest level possible to the unknown lowermost level, less one level, is less than the total number of pixels in the image multiplied by a tolerance factor designed to eliminate the impact of noise on the pixels color values, and
the sum of the number of pixels exhibiting a level within a prescribed range of levels extending from lowest level possible to the unknown lowermost level, is greater than or equal to the total number of pixels in the image multiplied by the tolerance factor, and
computing the uppermost level as the level wherein,
the sum of the number of pixels exhibiting a level within a prescribed range of levels extending from the unknown uppermost level to the highest level possible, is greater than or equal to the total number of pixels in the image multiplied by said tolerance factor, and the sum of the number of pixels exhibiting a level within a prescribed range of levels extending from the unknown uppermost level, plus one level, to the highest level possible, is less than the total number of pixels in the image multiplied by the tolerance factor;

computing the per channel average color level for a group of the brightest pixels;

comparing the color levels of pairs of the color channels to determine if the color levels in each compared pair are balanced; and whenever the color levels of a compared color channel pair are determined not to be balanced, linearly expanding the dynamic range of the color channel with the narrower range to match the channel with the wider dynamic range to a desired degree for each of said channel pairs found to be out of balance.

* * * * *